US012615510B2

(12) United States Patent
Kunz et al.

(10) Patent No.: US 12,615,510 B2
(45) Date of Patent: Apr. 28, 2026

(54) KEY-BASED AUTHENTICATION FOR A MOBILE EDGE COMPUTING NETWORK

(71) Applicant: LENOVO (BEIJING) LIMITED, Beijing (CN)

(72) Inventors: Andreas Kunz, Ladenburg (DE); Sheeba Bakia Mary Baskaran, Friedrichsdorf (DE); Tingfang Tang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 336 days.

(21) Appl. No.: 18/029,341

(22) PCT Filed: Sep. 30, 2020

(86) PCT No.: PCT/CN2020/119365
§ 371 (c)(1),
(2) Date: Mar. 29, 2023

(87) PCT Pub. No.: WO2022/067654
PCT Pub. Date: Apr. 7, 2022

(65) Prior Publication Data
US 2023/0388788 A1     Nov. 30, 2023

(51) Int. Cl.
H04W 12/30          (2021.01)
H04L 9/08           (2006.01)
(Continued)

(52) U.S. Cl.
CPC ......... H04W 12/041 (2021.01); H04L 9/0861 (2013.01); H04L 9/14 (2013.01); H04W 12/069 (2021.01); H04W 12/106 (2021.01)

(58) Field of Classification Search
CPC ............. H04W 12/041; H04W 12/069; H04W 12/106; H04W 12/03; H04W 12/72;
(Continued)

(56) References Cited

U.S. PATENT DOCUMENTS

| | | | |
|---|---|---|---|
| 2014/0006786 A1 | 1/2014 | Campagna et al. | |
| 2015/0281188 A1* | 10/2015 | Sakemi | H04L 63/0861 |
| | | | 713/171 |

(Continued)

FOREIGN PATENT DOCUMENTS

| | | | |
|---|---|---|---|
| CA | 3019276 A1 * | 11/2017 | H04W 4/70 |
| CA | 3053316 A1 * | 8/2018 | G06F 21/64 |

(Continued)

OTHER PUBLICATIONS

International Searching Authority, "Written Opinion of the International Searching Authority," PCT/CN2020/119365, Jun. 21, 2021, pp. 1-4.

(Continued)

*Primary Examiner* — Tanmay K Shah
(74) *Attorney, Agent, or Firm* — Kunzler Needham & Hilton

(57) ABSTRACT

Apparatuses, methods, and systems are disclosed for key-based authentication for a mobile edge computing network. One method (800) includes deriving (805), at a user equipment, a first network key after authentication with a network function of a wireless core network, deriving (810) a second network key based on the first network key, the second network key for a first network function of a mobile edge computing network, sending (815) a registration request message to the first network function of the mobile edge computing network, the registration request message integrity protected with the second network key, receiving (820) a registration response message from the first network function, and, in response to verifying the integrity of the registration response message using the second network key, establishing (825) a secure communication with the first network function of the mobile edge computing network based on the second network key.

20 Claims, 11 Drawing Sheets

(51) Int. Cl.

| | |
|---|---|
| *H04L 9/14* | (2006.01) |
| *H04W 12/041* | (2021.01) |
| *H04W 12/069* | (2021.01) |
| *H04W 12/106* | (2021.01) |

(58) Field of Classification Search
CPC ......... H04L 9/0861; H04L 9/14; H04L 67/10; H04L 63/0272; H04L 63/164; H04L 9/3242; H04L 9/088
USPC ........................................................ 455/411
See application file for complete search history.

(56) References Cited

U.S. PATENT DOCUMENTS

| | | | | |
|---|---|---|---|---|
| 2017/0300978 | A1* | 10/2017 | Narasimhan ....... | G06Q 20/3829 |
| 2020/0280559 | A1* | 9/2020 | Wu ..................... | H04L 63/0815 |

FOREIGN PATENT DOCUMENTS

| | | | |
|---|---|---|---|
| CN | 108173882 A | 6/2018 | |
| CN | 108781366 A | 11/2018 | |

OTHER PUBLICATIONS

Jia, Xiaoying et al. "A Provacably Secure and Efficient Identity-Based Anonymous Authentication Scheme for Mobile Edge Computing", IEEE Systems Journal, vol. 14, No. 1, Mar. 31, 2020 (Mar. 31, 2020), pp. 1-12.

Samsung, "Authentication/Authorization framework for Edge Enabler Client and Servers", 3GPP TSG-SA3 Meeting #100e S3-202062, Aug. 17-28, 2020, pp. 1-3.

Apple, "pCR: New solution on authentication based on 3GPP credentials", 3GPP TSG-SA WG3 Meeting #100e S3-202151, Aug. 17-28, 2020, pp. 1-3.

Lenovo et al., "Authentication and Authorization with the Edge Data Network", 3GPP TSG-SA3 Meeting #100bis-e S3-202605, Oct. 12-16, 2020, pp. 1-3.

3GPP, "3rd Generation Partnership Project; Technical Specification Group Services and System Aspects; Study on Security Aspects of Enhancement of Support for Edge Computing in 5GC (Release 17)", 3GPP TR 33.839 V0.1.0, Aug. 2020, pp. 1-24.

* cited by examiner

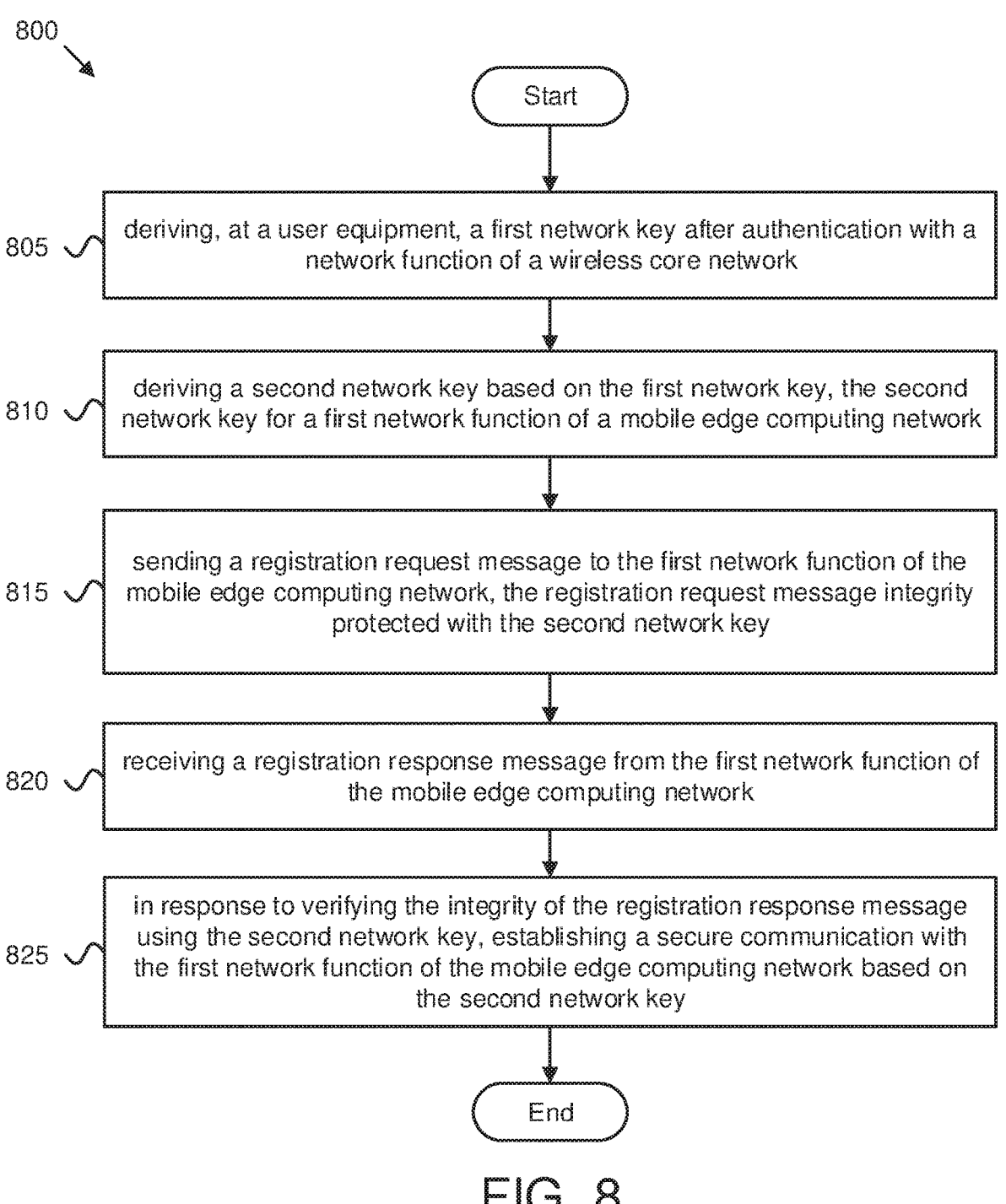

800

Start

805 — deriving, at a user equipment, a first network key after authentication with a network function of a wireless core network 810 — deriving a second network key based on the first network key, the second network key for a first network function of a mobile edge computing network 815 — sending a registration request message to the first network function of the mobile edge computing network, the registration request message integrity protected with the second network key 820 — receiving a registration response message from the first network function of the mobile edge computing network 825 — in response to verifying the integrity of the registration response message using the second network key, establishing a secure communication with the first network function of the mobile edge computing network based on the second network key End

FIG. 8

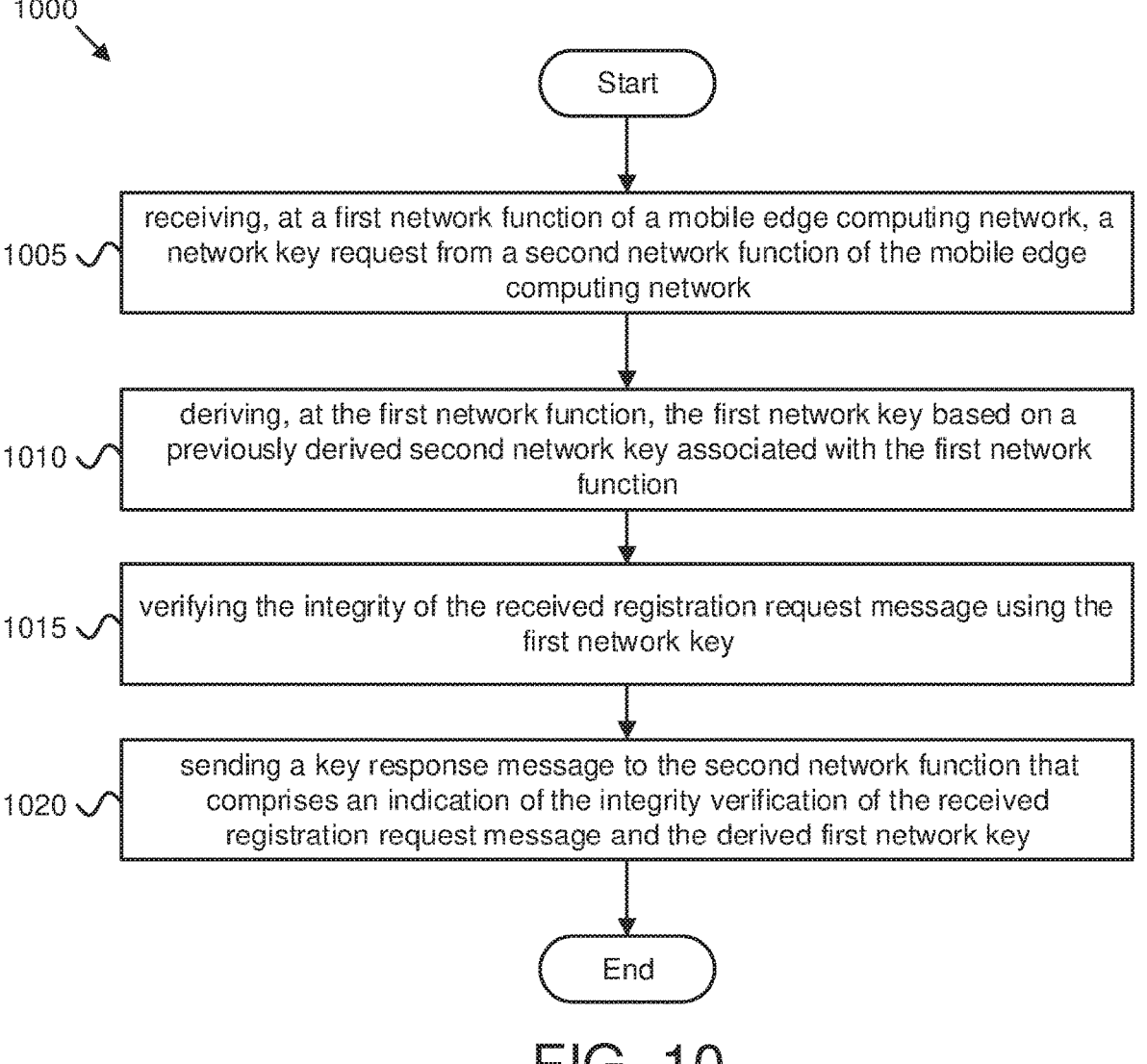

1000

Start

1005 — receiving, at a first network function of a mobile edge computing network, a network key request from a second network function of the mobile edge computing network 1010 — deriving, at the first network function, the first network key based on a previously derived second network key associated with the first network function 1015 — verifying the integrity of the received registration request message using the first network key 1020 — sending a key response message to the second network function that comprises an indication of the integrity verification of the received registration request message and the derived first network key End

FIG. 10

KEY-BASED AUTHENTICATION FOR A MOBILE EDGE COMPUTING NETWORK

FIELD

The subject matter disclosed herein relates generally to wireless communications and more particularly relates to key-based authentication for a mobile edge computing network.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Fifth Generation QoS Identifiers ("5QI"), 5G-GUTI ("5G Globally Unique Temporary UE Identity") Authentication, Authorization and Accounting ("AAA"), Artificial Intelligence ("AI"), Application Function ("AF"), Advanced Intersection Collision Warning ("AICW"), Access and Mobility Management Function ("AMF"), Positive-Acknowledgment ("ACK"), Application Programming Interface ("API"), Access Stratum ("AS"), Authentication Server Function ("AUSF"), Base Station ("BS"), Category of Requirements ("CoR"), Command-and-Control ("C2"), Control Element ("CE"), Cooperating merging ("CM"), Cooperative Overtaking ("CO"), Cooperating Transition of Control ("CToC"), Cooperative Lane Change ("CLC"), Collective Perception ("CP"), Collective Perception Message ("CPM"), Core Network ("CN"), Connected and Autonomous Vehicle ("CAV"), Decentralized Environmental Notification Message ("DENM"), Downlink ("DL"), Data Radio Bearer ("DRB"), Discontinuous Transmission ("DTX"), Edge Enabler Client ("EEC"), Edge Configuration Server ("ECS"), Edge Application Server ("EAS"), Edge Enabler Server ("EES"), Evolved Node-B ("eNB"), Evolved Packet Core ("EPC"), Evolved Packet System ("EPS"), Evolved UMTS Terrestrial Radio Access ("E-UTRA"), Evolved UMTS Terrestrial Radio Access Network ("E-UTRAN"), European Telecommunications Standards Institute ("ETSI"), Fully-Qualified Domain Name ("FQDN"), Guaranteed Bit Rate ("GBR"), Guaranteed Flow Bit Rate ("GFBR"), General Packet Radio Service ("GPRS"), Generic Public Service Identifier ("GPSI"), Global System for Mobile Communications ("GSM"), Hybrid Automatic Repeat Request ("HARQ"), Home Subscriber Server ("HSS"), Information Element ("IE"), Internet-of-Things ("IoT"), International Mobile Equipment Identity ("IMEI"), Intelligent Transportation System ("ITS"), ITS Station ("ITS-S"), Infrastructure to Vehicle Information Message ("IVIM"), Key Derivation Function ("KDF"), Key Performance Indicator ("KPI"), Level of Automation ("LoA"), Long Term Evolution ("LTE"), Message Authentication Code for Integrity ("MAC-I"), Mobile or Multi-access Edge Computing ("MEC"), Machine Learning ("ML"), Mobility Management ("MM"), Mobility Management Entity ("MME"), Map (topology) Extended Message ("MAPEM"), Maneuver Control ("MC"), Maneuver Control Message ("MCM"), Mean Opinion Score ("MOS"), Mobile Station International Subscriber Directory Number ("MSISDN"), Negative-Acknowledgment ("NACK") or ("NAK"), Network Exposure Function ("NEF"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Slice Selection Assistance Information ("NSSAI"), Overtaking Vehicle Warning ("OVW"), Packet Delay Budget ("PDB"), Packet Error Rate ("PER"), Packet Data Unit ("PDU", used in connection with 'PDU Session'), PC5 5QI ("PQI"), Permanent Equipment Identifier ("PEI"), Platoon Control ("PC"), Platoon Control Message ("PCM"), Proximity Service ("ProSe"), Public Land Mobile Network ("PLMN"), QoS Flow Indicator ("QFI"), Quality of Experience ("QoE"), Quality of Service/Experience ("QoS"), Predictive QoS ("P-QoS"), Radio Access Network ("RAN"), Radio Network Information Service ("RNIS"), Radio Resource Control ("RRC"), Receive ("RX"), Road Side Unit ("RSU"), Security Association ("SA"), Service Capability Exposure Function ("SCEF"), Service Enabler Architecture Layer ("SEAL"), Service-Level Agreement ("SLA"), Session Management ("SM"), Session Management Function ("SMF"), Service Provider ("SP"), Single Network Slice Selection Assistance Information ("S-NSSAI"), Signal Phase And Timing Extended Message ("SPATEM"), Signal Request Extended Message ("SREM"), Signal request Status Extended Message ("SSEM"), Subscription Permanent Identifier ("SUPI"), Target Driving Area Reservation ("TDAR"), Transport Block ("TB"), Transmit ("TX"), Vehicle-to-Everything ("V2X"), Vehicle-to-Infrastructure ("V2I"), Vehicle-to-Vehicle ("V2V"), Vehicle-to-Relay ("V2R"), V2X Application Enabler ("VAE"), Vulnerable Road User Protection ("VRUP"), Unified Data Management ("UDM"), Unmanned Aerial System ("UAS"), UAS Application Enabler ("UAE", i.e., having a UAE server and at least one UAE client), UAS Service Suppliers ("USS"), UAS Traffic Manager ("UTM"), Unmanned Aerial Vehicle ("UAV"), UAV Controller ("UAV-C"), User Data Repository ("UDR"), User Entity/Equipment (Mobile Terminal) ("UE"), Uplink ("UL"), User Plane ("UP"), UP Functions ("UPF"), Universal Mobile Telecommunications System ("UMTS"), UMTS Terrestrial Radio Access ("UTRA"), UMTS Terrestrial Radio Access Network ("UTRAN"), User Service Description ("USD"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

The subject matter disclosed herein describes apparatuses, methods, systems, and program products for key-based authentication for a mobile edge computing network. The subject matter disclosed herein describes a key-derivation hierarchy for a mobile edge computing network based on an AMF key $K_{AMF}$ of the serving network and subsequent mobile edge computing network keys for ECS, EES, and EAS. The AMF performs the first authentication of a registration request from a mobile edge computing network function and the subsequent authentications for mobile edge computing network functions/entities are performed inside the mobile edge computing network. The derived key(s) is used to integrity protect the messages between UE and the mobile edge computing network functions/entities as well as to establish an IPsec SA between the UE and the mobile edge computing network functions/entities.

BRIEF SUMMARY

Methods for key-based authentication for a mobile edge computing network are disclosed. Apparatuses and systems also perform the functions of the methods.

One method for key-based authentication for a mobile edge computing network includes deriving, at a user equipment, a first network key after authentication with a network function of a wireless core network, deriving a second network key based on the first network key, the second network key for a first network function of a mobile edge computing network, sending a registration request message to the first network function of the mobile edge computing network, the registration request message integrity protected with the second network key, receiving a registration response message from the first network function, and, in response to verifying the integrity of the registration response message using the second network key, establishing a secure communication with the first network function of the mobile edge computing network based on the second network key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flowchart diagram illustrating one embodiment of a method that may be used for key-based authentication for a mobile edge computing network;

FIG. 10 is a flowchart diagram illustrating one embodiment of yet another method that may be used for key-based authentication for a mobile edge computing network.

DETAILED DESCRIPTION

Figure 1A:
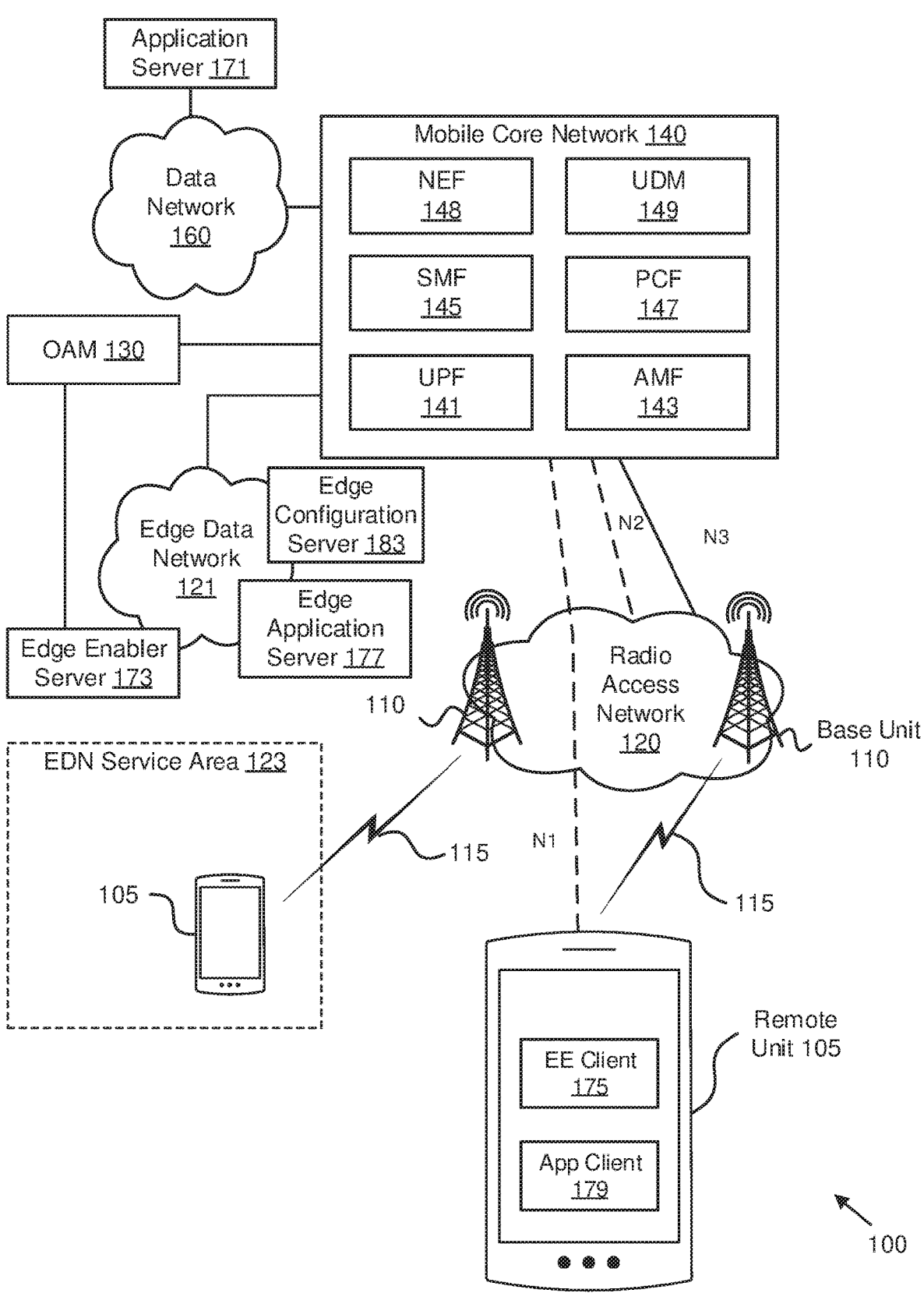
FIG. 1A is a schematic block diagram illustrating one embodiment of a wireless communication system for key-based authentication for a mobile edge computing network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for authenticating an EEC on a UE towards an EES, ECS, and/or EAS, as well as how to enable protection of the relevant communication interfaces, for an edge mobile computing network.

A mobile edge computing ("MEC") key hierarchy is based on the AMF key $K_{AMF}$ in the serving network. The AMF acts as an authenticator for the Edge Network and provides the first key to the edge network, which is the root key for the following edge network keys of the next authentications with the edge network entities. The UE derives the edge network keys $K_{ECS}$, $K_{EES}$, $K_{EAS}$ and is able to integrity protect the registration messages to the ECS, EES and EAS. The UE uses the UE ID (e.g., ECC ID, EEC ID, 5G-GUTI, SUCI, UE's IP address, external ID, or the like) at least in the first registration message. The higher layer edge network entity requests the authentication of the registration message and the newly derived key from the lower layer edge network entity, e.g. EES from ECS or EAS from EES. The edge network entities ECS, EES and EAS perform integrity protection of the registration response message to the UE with the respective key $K_{ECS}$, $K_{EES}$, $K_{EAS}$. The UE uses the edge network key $K_{ECS}$, $K_{EES}$, $K_{EAS}$ to setup an IPsec tunnel with the respective edge network entity ECS, EES and EAS.

The subject matter disclosed herein is based on the principle that the AMF key $K_{AMF}$ is used to derive the first authentication key, e.g., $K_{ECS}$. All following keys are derived based on this root key for the MEC network authentication and key agreement. The authentication framework foresees that there is a mutual authentication between various entities in the MEC network—e.g., EEC to ECS, EEC to EES, EEC to EAS, or the like. The key from the previous authentication is used as input for the next authentication which is based on the verification of the MAC-I of the registration message, performed already with the next key.

In conventional systems, authentication between EEC and ECS based on primary authentication, the AUSF is performing the authentication of the request from the ECS based on a key derived from $K_{AUSF}$ and a corresponding key ID. It is unknown how the AUSF provides the key ID to the UE in order to synchronize the key derivation in AUSF and UE. Further the response message to the application registration request from the ECS to the UE is not protected, thus it could be intercepted and manipulated by a man in the middle attack, changing the registration result into the opposite. Further the solution does not describe how the communication path is protected after authentication.

Additionally, in other solutions of an Authentication/Authorization framework for Edge Enabler Client and Servers, the assumption is that the UE is preconfigured with all MEC platforms in the network and all their certificates. This makes the security handling very difficult. Both solutions have the drawback that always the AUSF in the home network is involved but the MEC service itself is a local service and is executed in case of roaming in the visited network.

FIG. 1A depicts a wireless communication system 100 that supports key-based authentication for a mobile edge computing network including at least one edge data network ("EDN") 121 supporting an EDN service area 123. The EDN 121 includes at least one Edge Application Server ("EAS") 177 supporting an instance of an application. When a remote unit 105 is located in the EDN service area 123, the application client 179 on the remote unit 105 is able to access the EAS 177. However, when the remote unit 105 is outside any EDN service area 123, the application client 179 is able to access an instance of the application using the application server 171 located in the data network 160 (i.e., a regional data network). The EDN 121 also includes an edge enabler server ("EES") 173, an edge configuration server ("ECS") 183, a middleware application enabler server, while the remote unit 105 includes an edge enabler client ("EEC") 175.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with a communication host (e.g., edge application server 173 and/or application server 171) via a network connection with the mobile core network 140. For example, an application client 179 in a remote unit 105 may trigger the remote unit 105 to establish a PDU session (or other data connection) with the mobile core network 140 via the RAN 120. The mobile core network 140 then relays traffic between the remote unit 105 and the communication host (i.e., application server) using the PDU session. Note that the remote unit 105 may establish one or more PDU sessions (or other data connections) with the mobile core network 140. As such, the remote unit 105 may concurrently have at least one PDU session for communicating with one application server and at least one additional PDU session for communicating with another application server (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, a Network Exposure Function ("NEF") 148, and a Service Capability Exposure Function ("SCEF") 149. The NEF 148 and SCEF 149 provide means to securely expose the services and capabilities provided by 3GPP network interfaces.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network slice instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1A for ease of illustration, but their support is assumed.

The wireless communication system 100 may include an OAM/Management function 130. The OAM/Management function 130 may provide slice parameters (e.g., GSTs) to the enabler servers (e.g., EES 173). In various embodiments, the OAM/Management function 130 performs slice instantiation, e.g., in response to a request from a service provider.

Although specific numbers and types of network functions are depicted in FIG. 1A, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1A depicts components of a 5G RAN and a 5G core network, the described solutions apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term eNB/gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting middleware-assisted slice and/or DNN re-mapping for vertical applications and/or edge network deployments.

Figure 1B:
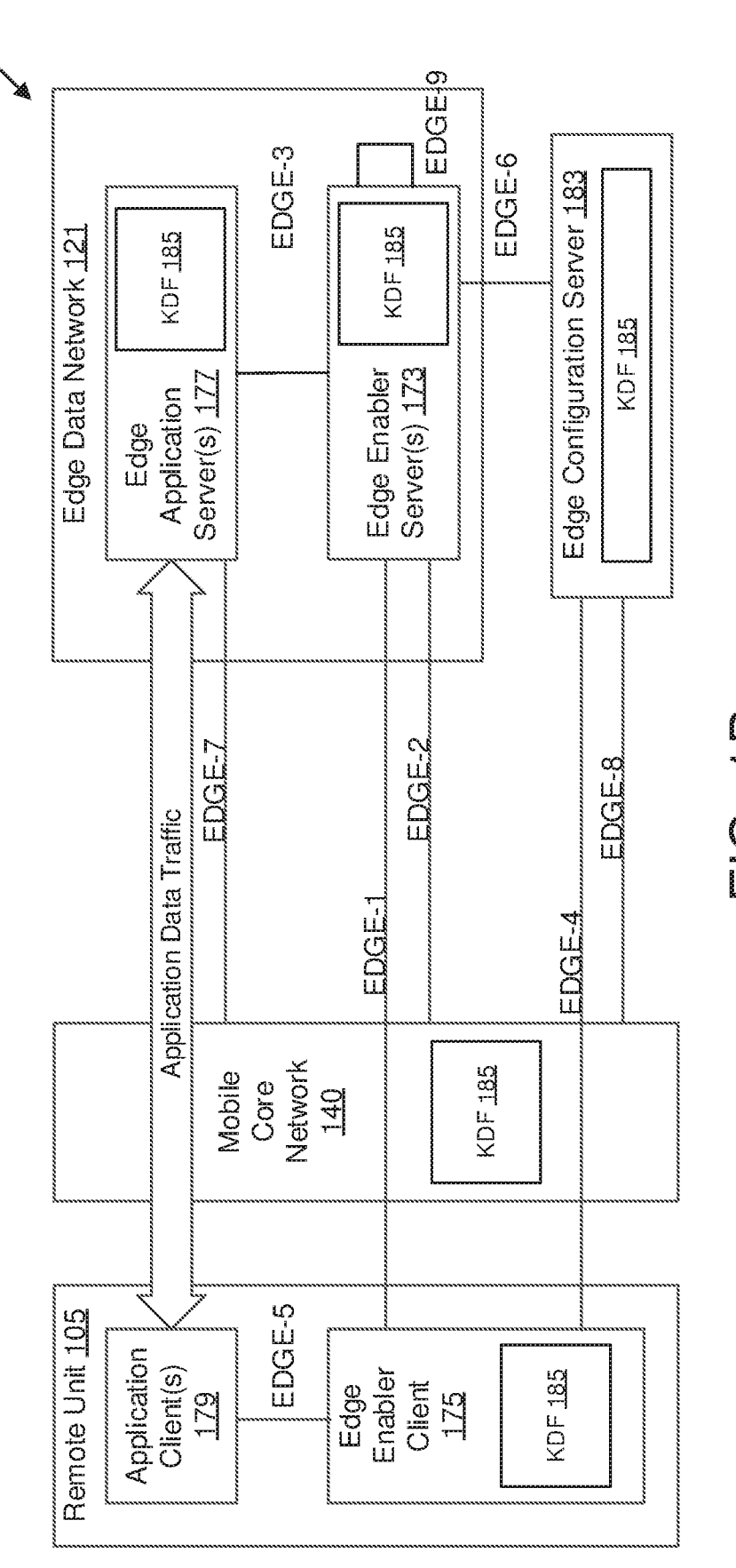
FIG. 1B is a diagram illustrating one embodiment of a network architecture for key-based authentication for a mobile edge computing network.

FIG. 1B depicts one embodiment of a network architecture 150 for key-based authentication for a mobile edge computing network. The depicted embodiment illustrates one example embodiment of the application layer architecture for mobile edge computing services. In this architecture, as illustrated in FIG. 1B [3GPP TS 23.558], the following entities can be defined:

The Edge Enabler Server ("EES") 173 provides supporting functions needed for Edge Application Servers 177 and Edge Enabler Clients 175, such as one or more of: a)

provisioning of configuration information to Edge Enabler Client 175, enabling exchange of application data traffic with the Edge Application Server 177; b) interacting with a mobile Core Network 140 for accessing the capabilities of network functions either directly (e.g. via PCF) or indirectly (e.g. via SCEF/NEF/SCEF+NEF); and c) supporting external exposure of 3GPP network capabilities to the Edge Application Server(s) 177 over EDGE-3. As depicted, the EES 173 may include a key derivation function 185 used to derive authentication keys related to the EES 173.

The Edge Enabler Client ("EEC") 175 provides supporting functions needed for Application Client(s) 179, such as retrieval and provisioning of configuration information to enable the exchange of Application Data Traffic with the Edge Application Server 177 and discovery of Edge Application Servers 177 available in the Edge Data Network 121. As depicted, the EEC 175 may include a key derivation function 185 used to derive authentication keys related to the EEC 175.

The Edge Configuration Server ("ECS") 183 provides supporting functions needed for the Edge Enabler Client 175 to connect with an Edge Enabler Server 173. These functionalities of the Edge Configuration Server 183 are related to the provisioning of edge configuration information to the EEC 175, which are used for establishing a connection with the EES 173. As depicted, the ECS 183 may include a key derivation function 185 used to derive authentication keys related to the ECS 183.

The Edge Application Server ("EAS") 177 is the application server resident in the Edge Data Network 121, performing the server functions. As depicted, the EAS 177 may include a key derivation function 185 used to derive authentication keys related to the EAS 177. The Application Client ("AC") 179 is the application resident in the remote unit 105 performing the client function.

In the current TS 23.558, there are several security related requirements in order to protect the architecture and the new functions for mobile edge computing. Those requirements The following security requirements are related to the subject matter disclosed herein:

a. [AR-5.2.6.2-c] Communication between the functional entities of the application layer architecture shall be protected.

b. [AR-5.2.6.2-d] The authentication and authorization for the use of Edge Computing services shall support the deployment where the functional entities providing the Edge Computing services are in the same trust domain as the 3GPP system, different trust domains or both.

c. [AR-5.2.6.2-e] The application layer architecture shall support the use of either 3GPP credentials or application specific credentials or both for different deployment needs, for the communication between the UE and the functional entities providing the Edge Computing service.

d. [AR-5.2.6.2-f] The application layer architecture shall support mutual authentication and authorization check between clients and servers or servers and servers that interact.

These requirements have been converted into key issues relevant to the problem of authentication of an EEC 175, which is residing in a remote unit 105, e.g., a UE:

Key issue #1: Authentication and Authorization between EEC 175 and EES 173 i. Edge Enabler Server 173 shall be able to provide mutual authentication with Edge Enabler Client 175 over EDGE-1 Interface.

ii. Edge Enabler Server 173 shall be able to determine whether Edge Enabling Client 175 is authorized to access Edge Enabling Server's services.

Key issue #2: Authentication and Authorization between EEC 175 and ECS 183 i. Edge Configuration Server 183 shall be able to provide mutual authentication with Edge Enabler Client 175 over EDGE-4 Interface.

ii. Edge Configuration Server 183 shall be able to determine whether Edge Enabler Client 175 is authorized to access provisioning services offered by Edge Configuration Server 183.

Key issue #6: Transport security for the EDGE-1-9 interfaces i. Confidentiality protection, integrity protection and replay-protection shall be supported on the EDGE-1-4, and EDGE 6-9 interfaces.

The problem that the subject matter herein describes a solution to is how to authenticate an EEC 175 towards mobile edge computing network functions, entities, devices, or the like such as an EES 173, an ECS 183, and/or an EAS 177, as well as how to enable protection of the relevant communication interfaces.

Figure 2:
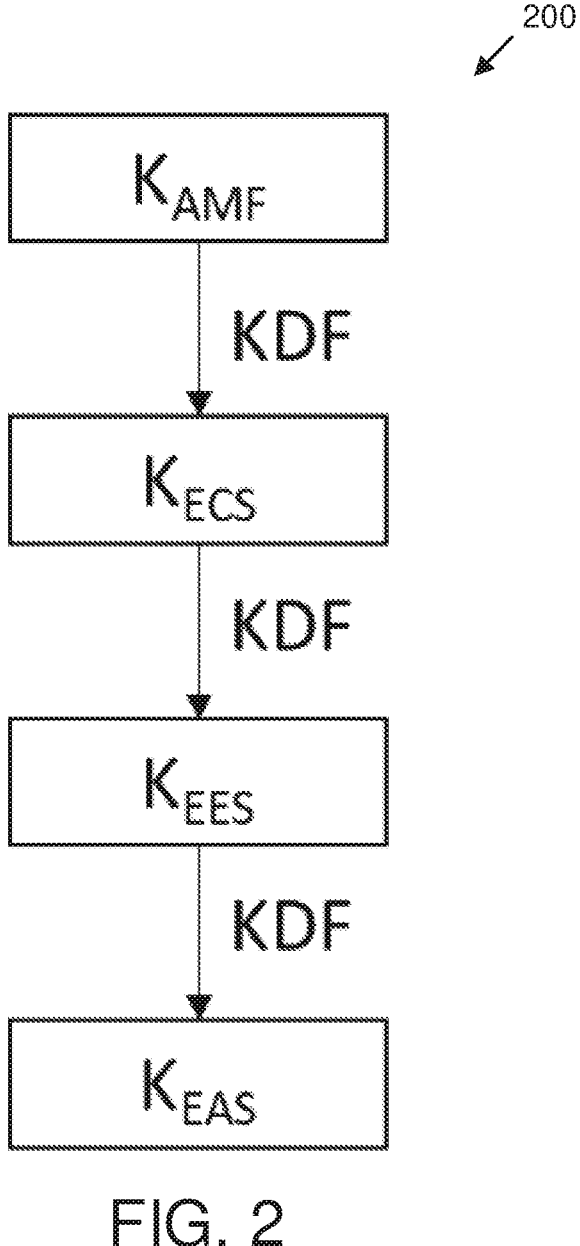
FIG. 2 is a diagram illustrating one example key hierarchy for key-based authentication for a mobile edge computing network.

FIG. 2 is a diagram illustrating one example key hierarchy for key-based authentication for a mobile edge computing network. As described above, the subject matter disclosed herein is based on the principle that the AMF key $K_{AMF}$ is used to derive the first authentication key for the mobile edge computing network, e.g., $K_{ECS}$. All of the following keys are derived based on this root key for the mobile edge computing network authentication and key agreement. The authentication framework foresees that there is a mutual authentication between various entities in the MEC network—e.g., EEC to ECS, EEC to EES, EEC to EAS, or the like. The key from the previous authentication is used as input for the next authentication which is based on the verification of the MAC-I of the registration message, performed already with the next key.

Figure 3:
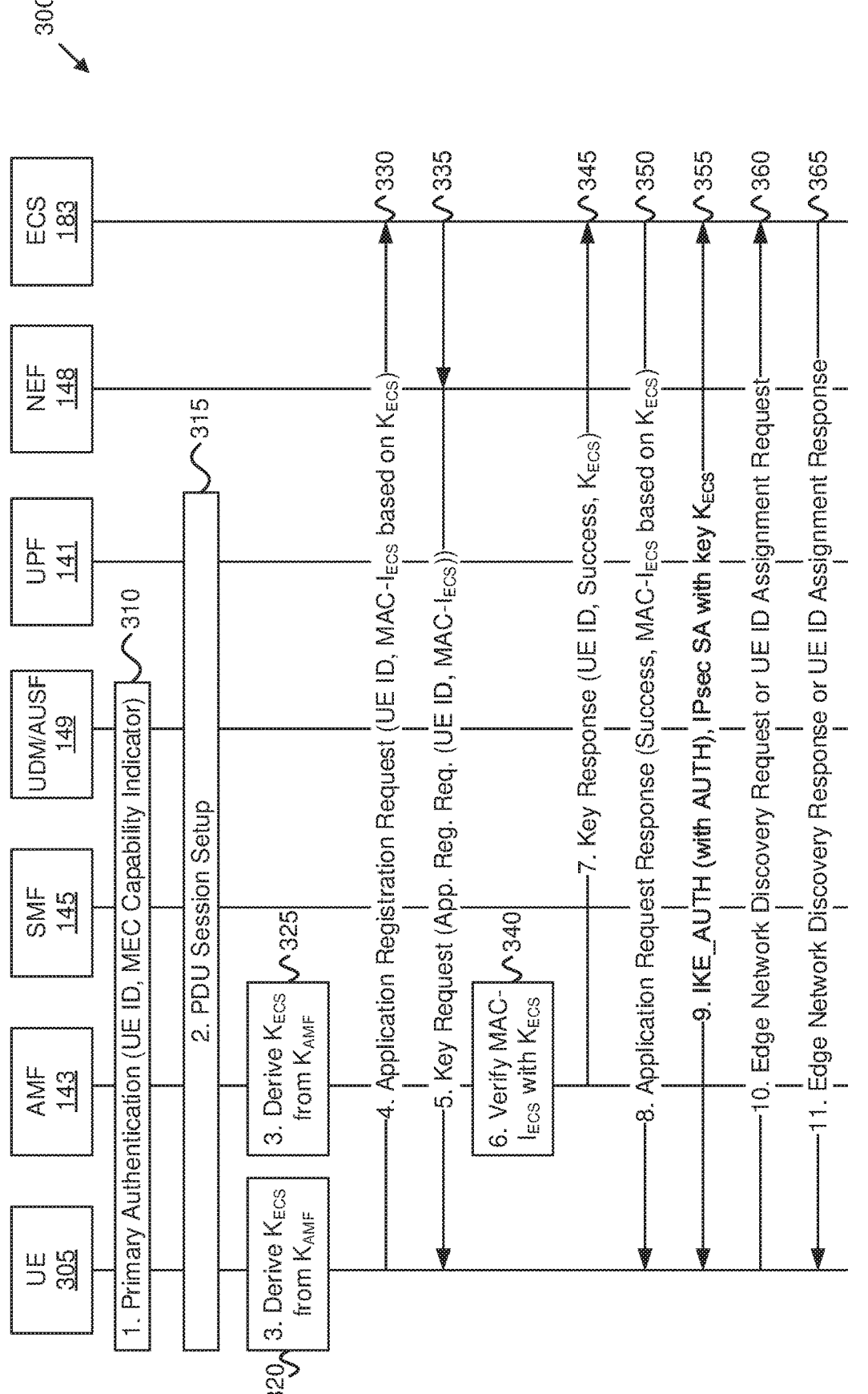
FIG. 3 is a diagram illustrating signaling flow for one embodiment of a procedure for key-based authentication for a mobile edge computing network.

FIG. 3 is a diagram illustrating signaling flow for one embodiment of a procedure 300 for key-based authentication for a mobile edge computing network. FIG. 3 depicts an authentication procedure between an EEC 175 and an ECS 183. The authentication of the EEC 175 for ECS 183 is performed in the AMF 143 in the serving network and the identification of the UE 305, e.g., remote unit 105, is done with an identifier for the UE 305, which may be the SUCI, 5G-GUTI, EEC ID, GPSI, UE's IP address and/or any other external ID, which is understood by the MEC platform.

As shown in the procedure depicted in FIG. 3, at step 1, the UE 305 performs normal primary authentication and registration to the network (see block 310). The UE 350 is capable of communicating with, using, connecting to, or the like the mobile edge computing network and may indicate its MEC capabilities and/or its UE ID (e.g. SUCI, 5G-GUTI, ECC ID, external ID, etc.) for MEC to the AMF 143 during the registration procedure. The provisioning of the UE ID may indicate the MEC capability implicitly to the AMF 143.

In step 2, the UE 350 establishes a PDU Session for IP connectivity (see block 315). In step 3, when it is established that the UE 305 is MEC capable, the UE 305 and the AMF 143 derive a key $K_{ECS}$ for authentication with the ECS 186 from the AMF key $K_{AMF}$ (see blocks 320 and 325) and may use at least one of the following additional inputs to the KDF 185: FC value, SUPI, EEC ID, Serving Network Name, MEC Key Distinguisher flag, and the length of each one.

The MEC Key Distinguisher flag may have the following example values, as shown in Table 1:

| MEC Key Distinguisher | Value |
| --- | --- |
| ECS Key | 0x01 |
| EES Key | 0x02 |
| EAS Key | 0x03 |

Here the MEC Key Distinguisher flag corresponds to the value for the ECS key. The input of above parameters may be used to form the string S to the KDF 185, at least one of the parameters may be used:

i. FC=0xYY, where YY indicates any hexadecimal number.

ii. P0=SUPI iii. L0=length of SUPI iv. P1=EEC ID v. L1=length of EEC ID vi. P2=Serving Network Name vii. L2=length of Serving Network Name viii. P3=MEC Key Distinguisher flag ix. L3=length of MEC Key Distinguisher flag The input key may be the 256-bit key for the AMF 143 $K_{AMF}$.

At step 4, the UE 305 sends an Application Registration Request (UE ID, MAC-IECS) to the ECS 183 (see messaging 330). The MAC-$I_{ECS}$ is computed based on the payload of the Application Registration Request, which forms the input Application Registration Request Data, and the key for the ECS 183 $K_{ECS}$ to the KDF 185. When deriving a MAC-$I_{ECS}$ from $K_{ECS}$, the following parameters may be used to form the input S to the KDF 185:

i. FC=0xZZ, where ZZ indicates any hexadecimal number.

ii. P0=Application Registration Request Data, iii. L0=length of Application Registration Request Data The input key may be the key for the ECS 183 $K_{ECS}$. The MAC-$I_{ECS}$ is identified with the one of the following {32, 64, 128, 256, 512, 1028, etc.} least significant bits of the output of the KDF 185.

At step 5, the UE 305 is not authenticated at the ECS 183 and the ECS 183 sends a UE Authentication Request to the NEF 148 (see messaging 335), which selects the serving AMF 143 based on the UE ID and forwards the message to the selected AMF 143.

At step 6, the AMF 143 verifies (see block 340) the MAC-$I_{ECS}$ of the Application Registration Request, e.g., the AMF 143 computes the MAC-I with the key $K_{ECS}$ over the Application Registration Request payload in the similar way as the UE 305 and compares the result with the MAC-$I_{ECS}$ included in message. If both are identical, the message can be authenticated to be sent by the UE 305.

At step 7, the AMF 143 sends a UE Authentication Response to the ECS 183 (see messaging 345), including the result of the authentication as well as the key for the ECS 183 $K_{ECS}$. It is assumed that the ECS 186 and the NEF 148 have a secure connection because they have a service level agreement and may belong to the same network, e.g., Network Domain Security applies.

At step 8, based on the authentication result, the ECS 183 determines whether to accept or to reject the Application Registration Request from the UE 305. The ECS 183 sends (see messaging 350) the Application Registration Response message to the UE 305, including the authentication result, and protects the message with a MAC-$I_{ECS}$ based on the received key $K_{ECS}$, in a similar way as the UE 305 protects the payload of the message in step 4.

At step 9, the UE 305 verifies the MAC-I$_{ECS}$ and if the authentication result and verification of the message are successful, then the UE 305 establishes an IPsec SA between the UE 305 and ECS 183 by using the ECS key $K_{ECS}$ (see messaging 355). All messages are now confidentiality and integrity protected by the IPsec tunnel.

At step 10, the UE 305 sends an Edge Network Discovery Request to retrieve the EES address or FQDN (see messaging 360). The UE 305 may also send a UE ID Request to retrieve a UE ID assigned by the ECS 183 for further usage in the next authentication steps with the EES 173 and EAS 177.

At step 11, the ECS 183 responds with a corresponding message to step 10 (see messaging 365) and provides either the EES address or FQN and/or the assigned UE ID, if requested.

Figure 4:
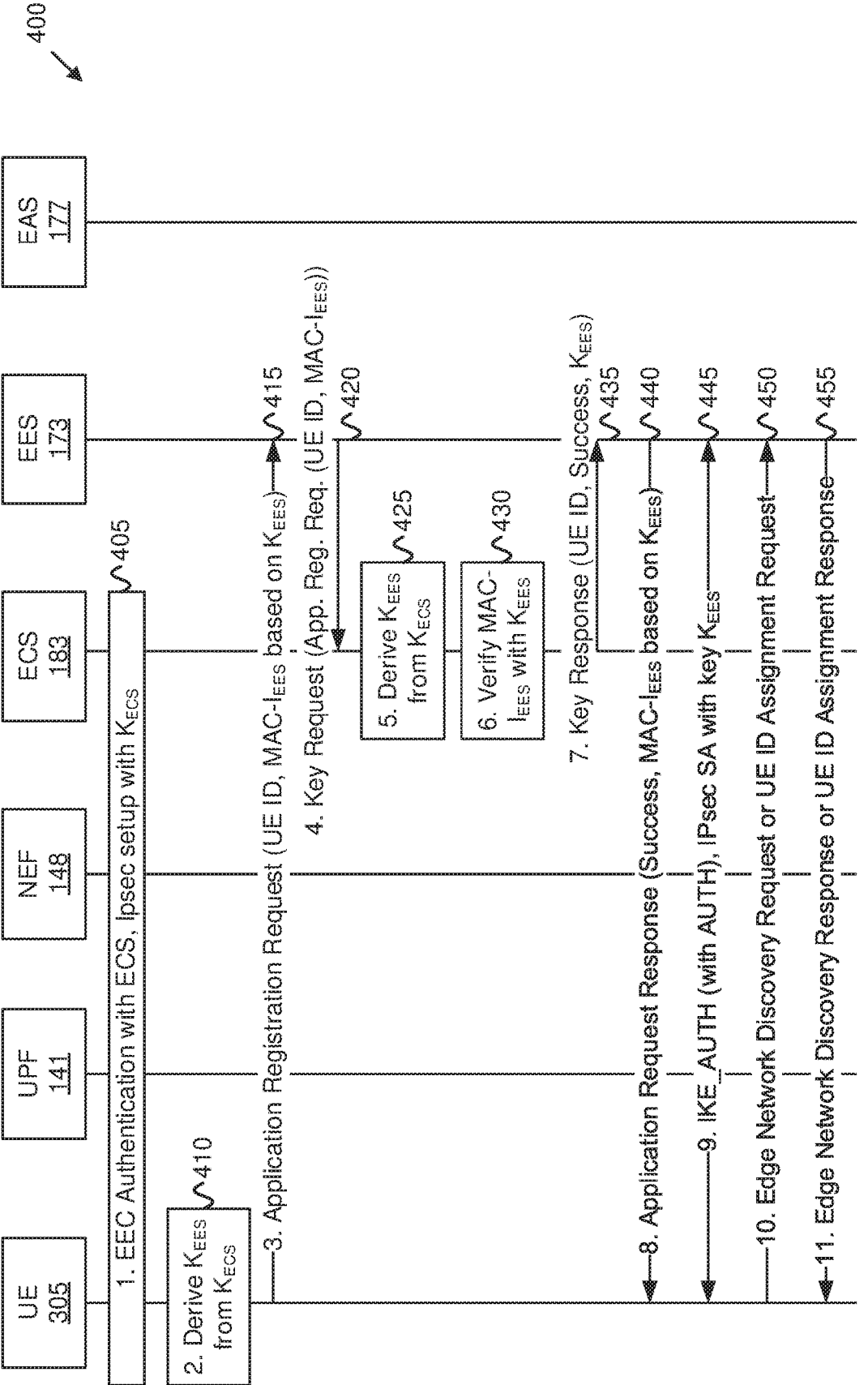
FIG. 4 is a diagram illustrating signaling flow for one embodiment of a procedure for key-based authentication for a mobile edge computing network.

FIG. 4 is a diagram illustrating signaling flow for one embodiment of a procedure 400 for key-based authentication for a mobile edge computing network. FIG. 4 depicts an authentication procedure between an EEC 175 and an EES 173 in the edge computing network using the identification of the UE 305, e.g., remote unit 105, which may be the 5G-GUTI, EEC ID, UE's IP address, and/or an assigned ID from the ECS 183.

As shown in the procedure depicted in FIG. 4, at step 1 it is assumed that the steps from a previous authentication between the EEC 175 and ECS 183 are carried out as a prerequisite (see block 405). In case no authentication is required between EEC 175 and ECS 183, the key derivation for the key of the ECS 183 $K_{ECS}$ may be skipped and the key for the EES 173 $K_{EES}$ may be derived directly from the key for the AMF 143 $K_{AMF}$ and provided to the EES 173 from the AMF 143 similar to the MAC-I$_{ECS}$ verification in FIG. 3, steps 6-8.

At step 2, the UE 305 derives (see block 410) the key for the EES 173 $K_{EES}$ from the key for the ECS 183 $K_{ECS}$ in the following way. The input of above parameters may be used to form the string S to the KDF 185, at least one of the parameters may be used:

i. FC=0xYY, where YY indicates any hexadecimal number.

ii. P1=EEC ID iii. L1=length of EEC ID iv. P2=MEC Key Distinguisher flag v. L2=length of MEC Key Distinguisher flag Here the MEC Key Distinguisher flag corresponds to the value for the EES key, as shown in Table 1. The input key may be the key for the ECS 183 $K_{ECS}$.

At step 3, the UE 305 sends an Application Registration Request (UE ID, MAC-I$_{EES}$) to the EES 173 (see messaging 415). The message may include the EEC ID. The MAC-I$_{EES}$ is computed based on the payload of the Application Registration Request, which forms the input Application Registration Request Data, and the key for the EES 173 $K_{EES}$ to the KDF 183:

When deriving a MAC-I$_{EES}$ from $K_{EES}$, the following parameters may be used to form the input string S to the KDF 185:

i. FC=0xZZ, where ZZ indicates any hexadecimal number.

ii. P0=Application Registration Request Data, iii. L0=length of Application Registration Request Data The input key Key may be the key for the EES 173 $K_{EES}$. The MAC-I$_{EES}$ is identified with the one of the following {32, 64, 128, 256, 512, 1028, etc.} least significant bits of the output of the KDF 185.

At step 4, the UE 305 is not authenticated at the EES 173 and the EES 173 sends a Key Request to the ECS 183 (see messaging 420). The selection of the ECS 183 may be based on the UE ID.

At step 5, the ECS 183 identifies the UE 305 based on the UE ID and derives (see block 425) the key for the EES 173 $K_{EES}$ based on the key for the ECS 183 in a similar way as the UE 305 in step 2.

At step 6, the ECS 183 verifies (see block 430) the MAC-I$_{EES}$ of the Application Registration Request, e.g., the ECS 183 computes with the key for the EES 173 $K_{EES}$ the MAC-I over the Application Registration Request payload in the similar way as the UE 305 and compares the result with the MAC-I$_{EES}$ included in message. If both are identical, the message can be authenticated to be sent by the UE 305.

At step 7, the ECS 183 sends (see messaging 435) a Key Request Response to the EES 173, including the result of the authentication as well as the $K_{EES}$. It is assumed that the ECS 183 and the EES 173 have a secure connection because they have a service level agreement and may belong to the same network, e.g., Network Domain Security applies.

At step 8, based on the authentication result, the EES 173 determines whether to accept or to reject the Application Registration Request from the UE 305. The EES 173 sends (see messaging 440) the Application Registration Response message to the UE 305 including the authentication result and protects the message with a MAC-I$_{EES}$ based on the received key for the EES 173 $K_{EES}$ in a similar way as the UE 305 protects the payload of the message in step 3.

At step 9, the UE 305 verifies the MAC-I$_{EES}$ and if the authentication result and verification of the message are successful, then the UE 305 establishes an IPsec SA between the UE 305 and EES 173 by using the EES key $K_{EES}$ (see messaging 445). All messages are now confidentiality and integrity protected by the IPsec tunnel.

At step 10, the UE 305 sends (see messaging 450) an Edge Network Discovery Request to retrieve the EAS address or FQDN. The UE 305 may also send a UE ID Request in order to retrieve a UE ID assigned by the EES 173 for further usage in the next authentication steps with the EAS 177.

At step 11, The EES 173 responds (see messaging 455) with a corresponding message to step 10 and provides either the EAS address or FQN and/or the assigned UE ID, if requested.

Figure 5:
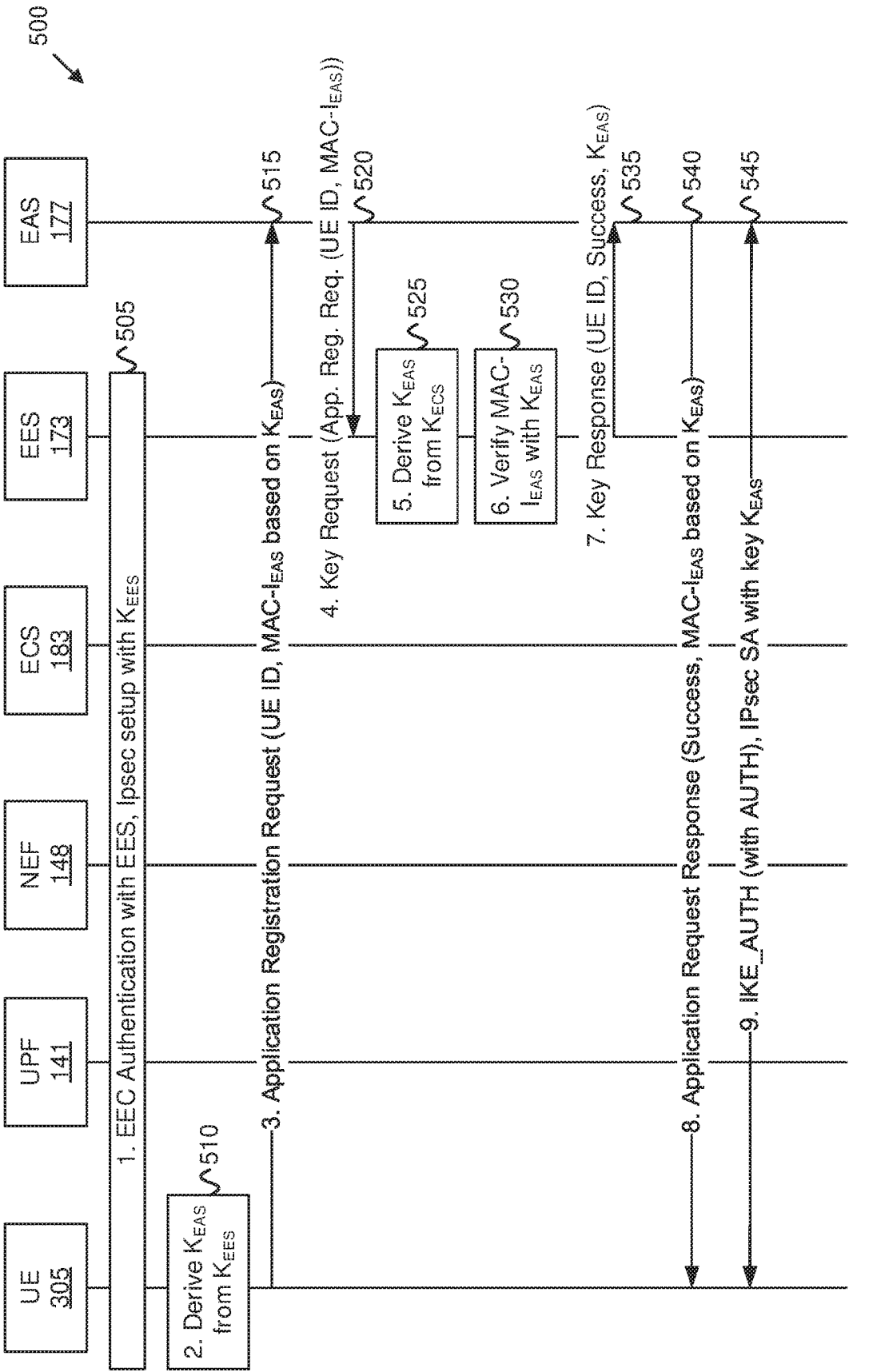
FIG. 5 is a diagram illustrating signaling flow for one embodiment of a procedure for key-based authentication for a mobile edge computing network.

FIG. 5 is a diagram illustrating signaling flow for one embodiment of a procedure 500 for key-based authentication for a mobile edge computing network. FIG. 5 depicts an authentication procedure between a EEC 175 and an EAS 177 in the edge computing network using the identification of the UE 305, e.g., remote unit 105, which may be the 5G-GUTI, EEC ID, UE's IP address, and/or an assigned ID from the ECS 183 or EES 173.

At step 1, it is assumed that the steps from a previous authentication between the EEC 175 and the ECS 173 and/or the EES 173 are carried out as a prerequisite (see block 505). In case no authentication is required between the EEC 175 and the ECS 173 and/or the EES 173, the key derivation for the EES 173 $K_{EES}$ may be skipped and the key for the EAS 177 $K_{EAS}$ may be derived directly from the AMF key $K_{AMF}$ and provided to the EAS 177 from the AMF 143, similar to the MAC-I$_{ECS}$ verification in FIG. 3, steps 6-8.

At step 2, the UE 305 derives (see block 510) the key for the EAS 177 $K_{EAS}$ from the key for the EES 173 $K_{EES}$ in the following way. The input of above parameters may be used to form the string S to the KDF 185, at least one of the parameters may be used:

i. FC=0xYY, where YY indicates any hexadecimal number.

ii. P1=EEC ID iii. L1=length of EEC ID iv. P2=MEC Key Distinguisher flag v. L2=length of MEC Key Distinguisher flag Here the MEC Key Distinguisher flag corresponds to the value for the EAS key, as shown in Table 1 above. The input key may be the key for the EES 173 $K_{EES}$.

At step 3, the UE sends an Application Registration Request (UE ID, MAC-I$_{EAS}$) to the EAS 177. The message may include the EEC ID. The message may be sent via NAS or via user plane or via the NEF 148. The MAC-I$_{EAS}$ is computed based on the payload of the Application Registration Request, which forms the input Application Registration Request Data, and the key for the EAS 177 $K_{EAS}$ to the KDF 185.

When deriving a MAC-I$_{EAS}$ from $K_{EAS}$, the following parameters may be used to form the input string S to the KDF 185:

i. FC=0xZZ, where ZZ indicates any hexadecimal number.

ii. P0=Application Registration Request Data, iii. L0=length of Application Registration Request Data The input key Key may be the key for the EAS 177 $K_{EAS}$. The MAC-I$_{EAS}$ is identified with the one of the following {32, 64, 128, 256, 512, 1028, etc.} least significant bits of the output of the KDF 185.

At step 4, the UE 305 is not authenticated at the EAS 177 and the EAS 177 sends (see messaging 520) a Key Request to the EES 173. The selection of the EES 173 may be based on the UE ID.

At step 5, the EES 173 identifies the UE 305 based on UE ID and derives (see block 525) the key for the EAS 177 $K_{EAS}$ in a similar way as the UE 305 in step 2.

At step 6, the EES 173 verifies (see block 530) the MAC-I$_{EAS}$ of the Application Registration Request, e.g., the EES 173 computes the MAC-I$_{EAS}$ with the EAS key $K_{EAS}$ over the Application Registration Request payload in the similar way as the UE 305 and compares the result with the MAC-I$_{EAS}$ included in message. If both are identical, the message can be authenticated to be sent by the UE 305.

At step 7, the EES 173 sends (see messaging 535) a Key Request Response to the EAS 177, including the result of the authentication as well as the EAS key $K_{EAS}$. It is assumed that the EES 173 and the EAS 177 have a secure connection because they have a service level agreement and may belong to the same network, i.e. Network Domain Security applies.

At step 8, based on the authentication result, the EAS 177 determines whether to accept or to reject the Application Registration Request from the UE 305. The EAS 177 sends (see messaging 540) the Application Registration Response message to the UE 305 including the authentication result and protects the message with a MAC-I$_{EAS}$ based on the received key for the EAS 177 $K_{EAS}$ in a similar way as the UE 305 protects the payload of the message in step 3.

At step 9, the UE 305 verifies the MAC-I$_{EAS}$ and if the authentication result and verification of the message are successful, then the UE 305 establishes (see messaging 545) an IPsec SA between the UE 305 and EAS 177 by using the EAS key $K_{EAS}$. All messages are now confidentiality and integrity protected by the IPsec tunnel.

Figure 6:
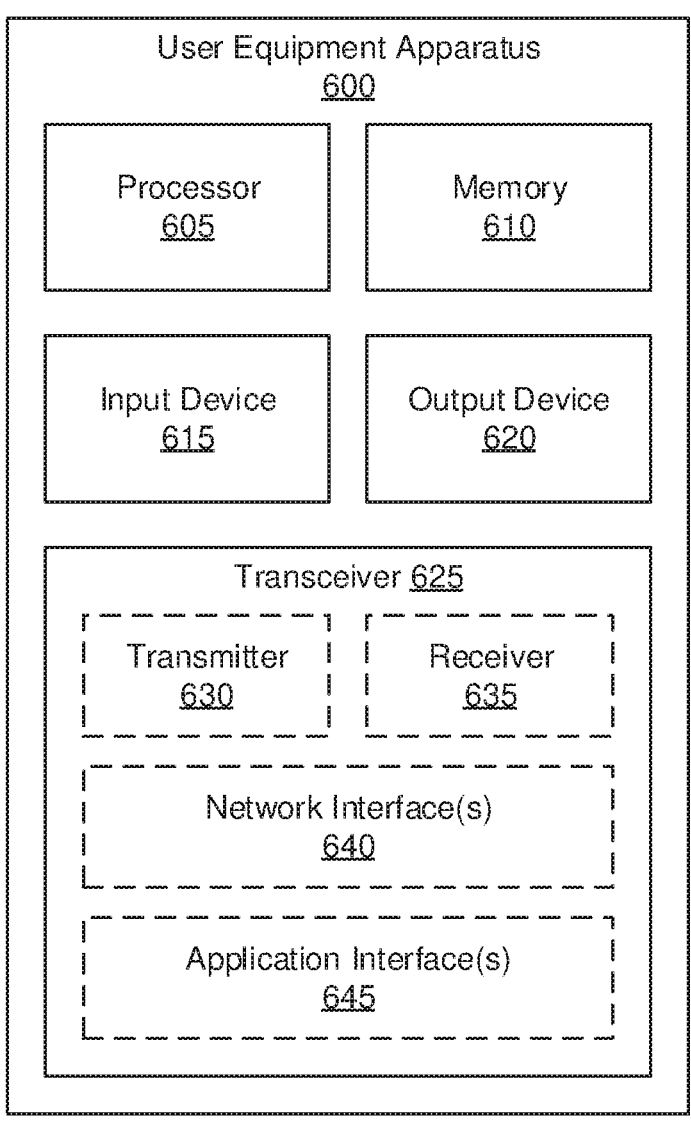
FIG. 6 is a diagram illustrating one embodiment of a user equipment apparatus that may be used for key-based authentication for a mobile edge computing network.

FIG. 6 is a diagram illustrating one embodiment of a user equipment apparatus that may be used for key-based authentication for a mobile edge computing network, according to embodiments of the disclosure. In various embodiments, the user apparatus 600 is used to implement one or more of the solutions described above. The user apparatus 600 may include a processor 605, a memory 610, an input device 615, an output device 620, and a transceiver 625. In some embodiments, the input device 615 and the output device 620 are combined into a single device, such as a touchscreen. In certain embodiments, the user apparatus 600 may not include any input device 615 and/or output device 620. In various embodiments, the user apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In various embodiments, the processor 605 controls the user apparatus 600 to implement the above described UE and/or UE client behaviors.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to authentication key derivation. For example, the memory 610 may store keys, identifiers, and/or other information related to key derivation. In certain embodiments, the memory 610 also stores program code and related data, such as an operating system or other controller algorithms operating on the UE.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

As discussed above, the transceiver 625 communicates with one or more network equipment devices, described below. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

In various embodiments, the transceiver 625 is configured to communication with 3GPP access network(s) and/or the non-3GPP access network(s). In some embodiments, the transceiver 625 implements modem functionality for the 3GPP access network(s) and/or the non-3GPP access network(s). In one embodiment, the transceiver 625 implements multiple logical transceivers using different communication protocols or protocol stacks, while using common physical hardware.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

The transceiver 625 may include one or more transmitters 630 and one or more receivers 635. Although a specific number of transmitters 630 and receivers 635 are illustrated, the user equipment apparatus 600 may have any suitable number of transmitters 630 and receivers 635. Further, the transmitter(s) 630 and the receiver(s) 635 may be any suitable type of transmitters and receivers. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like.

In various embodiments, the transceiver 625 is capable of communicating with a mobile core network via an access network. Accordingly, the transceiver 625 may support at least one network interface 640. Here, the at least one network interface 640 facilitates communication with a RAN node, such as an eNB or gNB, for example using the "Uu" interface (e.g., LTE-Uu for eNB, NR-Uu for gNB). Additionally, the at least one network interface 640 may include an interface used for communications with one or more network functions in the mobile core network, such as a UPF 141, an AMF 143, a SMF 145, and/or a PCF 147. In certain embodiments, the transceiver 625 may support a PC5 interface for sidelink communication. The transceiver 625 and/or processor 605 may support one or more application interfaces 645.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module. In certain embodiments, the transceiver 625 may implement a 3GPP modem (e.g., for communicating via NR or LTE access networks) and a non-3GPP modem (e.g., for communicating via Wi-Fi or other non-3GPP access networks).

Figure 7:
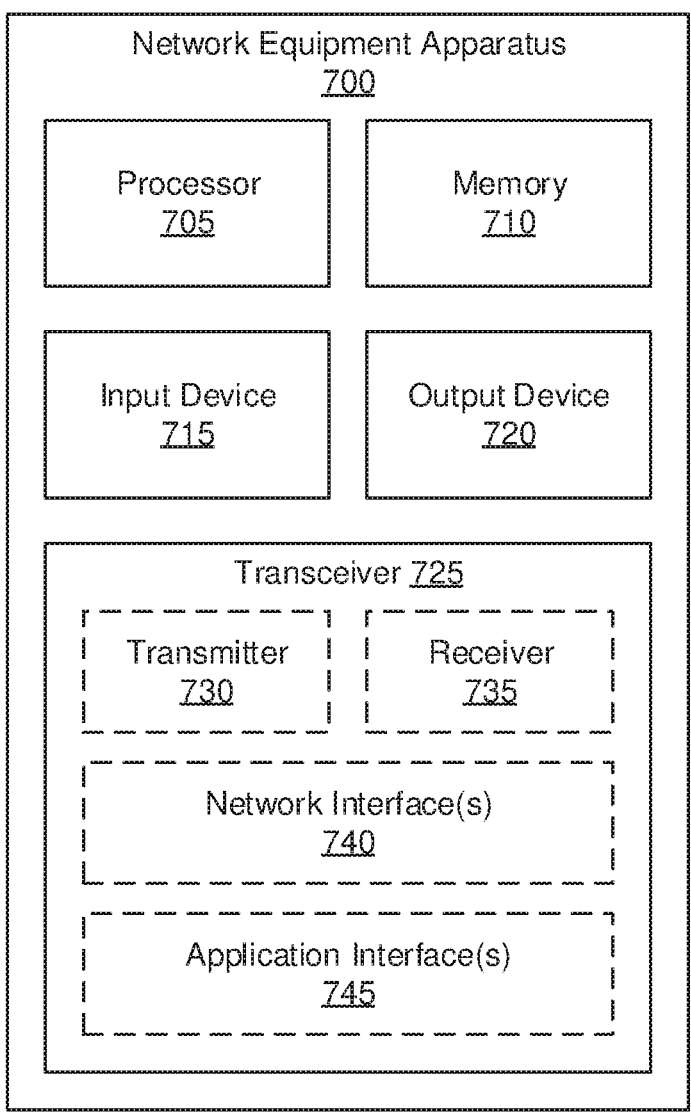
FIG. 7 is a diagram illustrating one embodiment of a network equipment apparatus that may be used for key-based authentication for a mobile edge computing network.

FIG. 7 is a diagram illustrating one embodiment of a network equipment apparatus that may be used for key-based authentication for a mobile edge computing network, according to embodiments of the disclosure. Network equipment apparatus 700 may include a processor 705, a memory 710, an input device 715, an output device 720, a transceiver 725, and application interface 745. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. In some embodiments, the transceiver 725 supports an interface (e.g., a Nnef interface) for communicating with a NEF (i.e., the NEF 148). Other network interfaces may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the first transceiver 725. In various embodiments, the processor 705 controls the network equipment apparatus 700 to implement the above described key-based authentication for a mobile edge computing network behaviors.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to selecting a server application instance, for example storing server addresses, UE locations, DNS cache, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, all, or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 120). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

FIG. 8 depicts one embodiment of a method 800 for key-based authentication for a mobile edge computing network, according to embodiments of the disclosure. In various embodiments, the method 800 is performed by a user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and derives 805, at a user equipment 600, a first network key after authentication with a network function of a wireless core network. The method 800 derives 810 a second network key based on the first network key. The second network key may be for a first network function of a mobile edge computing network.

The method 800 sends 815 a registration request message to the first network function of the mobile edge computing network. The registration request message may be integrity protected with the second network key. The method 800 receives 820 a registration response message from the first network function of the mobile edge computing network. The method 800, in response to verifying the integrity of the registration response message using the second network key, establishes 825 a secure communication with the first network function of the mobile edge computing network based on the second network key, and the method 800 ends.

Figure 9:
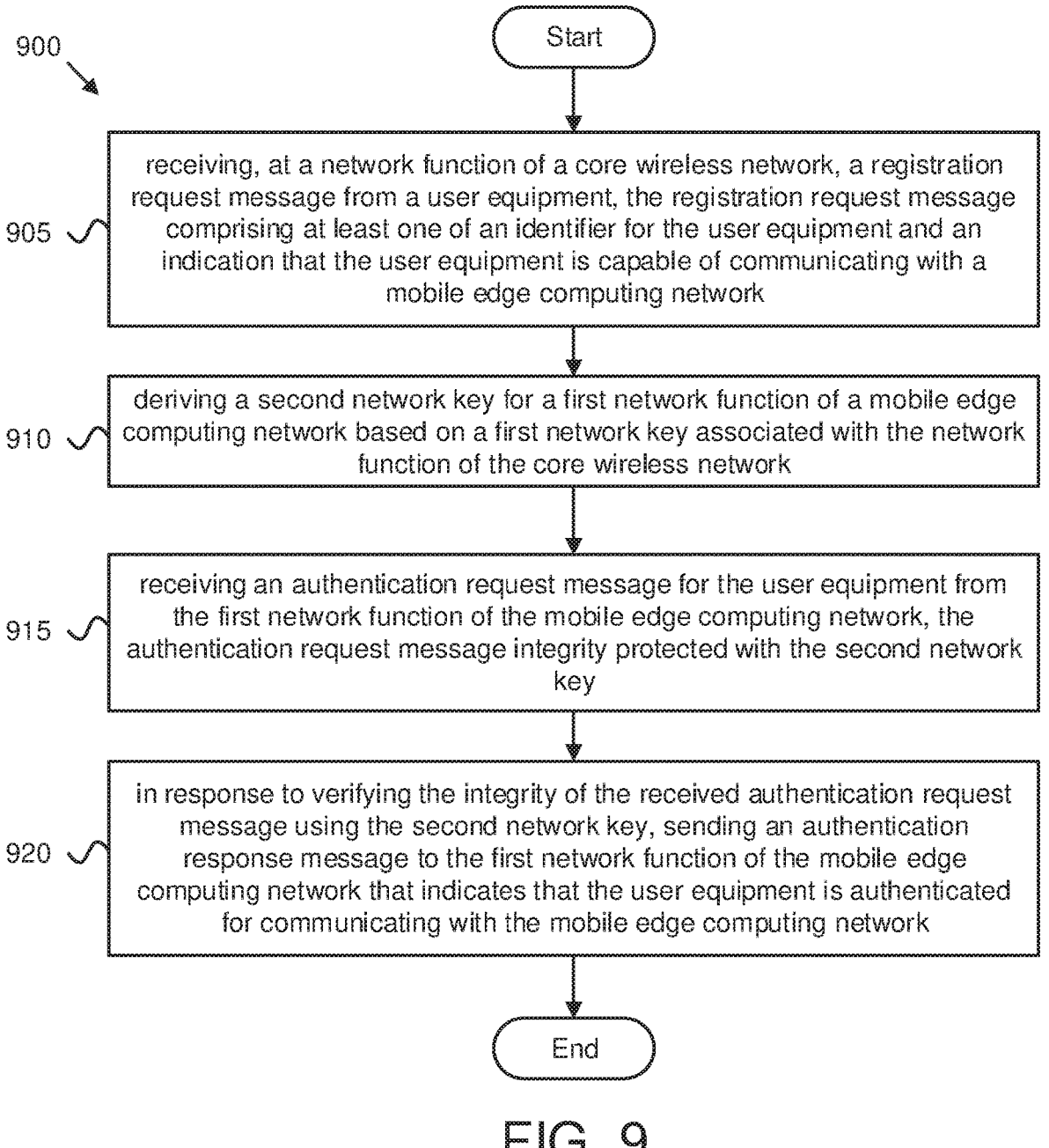
FIG. 9 is a flowchart diagram illustrating one embodiment of another method that may be used for key-based authentication for a mobile edge computing network.

FIG. 9 depicts one embodiment of a method 900 for key-based authentication for a mobile edge computing network, according to embodiments of the disclosure. In various embodiments, the method 900 is performed by a network equipment apparatus 600, described above. In some embodiments, the method 900 is performed by a processor, such as a microcontroller, a microprocessor, a CPU, a GPU, an auxiliary processing unit, a FPGA, or the like.

The method 900 begins and receives 905, at a network function of a wireless core network, a registration request message from a user equipment. The registration request message comprising at least one of an identifier for the user equipment and an indication that the user equipment is capable of communicating with a mobile edge computing network. The method 900 derives 910 a second network key for a first network function of a mobile edge computing network based on a first network key associated with the network function of the wireless core network.

The method 900 receives 915 an authentication request message for the user equipment from the first network function of the mobile edge computing network. The authentication request message is integrity protected with the second network key. The method 900, in response to verifying the integrity of the received authentication request message using the second network key, sends 925 an authentication response message to the first network function of the mobile edge computing network that indicates that the user equipment is authenticated for communicating with the mobile edge computing network, and the method 900 ends.

FIG. 10 depicts one embodiment of a method 1000 for key-based authentication for a mobile edge computing network, according to embodiments of the disclosure. In various embodiments, the method 1000 is performed by a network equipment apparatus 700, described above, which may be part of a mobile edge computing network. In some embodiments, the method 1000 is performed by a processor, such as a microcontroller, a microprocessor, a CPU, a GPU, an auxiliary processing unit, a FPGA, or the like.

The method 1000 begins and receives 1005, at a first network function of a mobile edge computing network, a network key request from a second network function of the mobile edge computing network. The network key request includes a registration request message for a user equipment that is integrity protected with a first network key. The method 1000 derives 1010, at the first network function, the first network key based on a previously derived second network key associated with the first network function.

The method 1000 verifies 1015 the integrity of the received registration request message using the first network key. The method 1000 sends 1020 a key response message to the second network function that comprises an indication of the integrity verification of the received registration request message and the derived first network key, and the method 1000 ends.

Disclosed herein is a first method for key-based authentication for a mobile edge computing network. The first method may be performed by a user equipment apparatus 600. The first method includes deriving, at a user equipment, a first network key after authentication with a network function of a wireless core network. The method includes deriving a second network key based on the first network key, the second network key for a first network function of a mobile edge computing network. The method includes sending a registration request message to the first network function of the mobile edge computing network, the registration request message integrity protected with the second network key. The method includes receiving a registration response message from the first network function of the mobile edge computing network. The method includes, in response to verifying the integrity of the registration response message using the second network key, establishing a secure communication with the first network function of the mobile edge computing network based on the second network key.

In certain embodiments, the method includes deriving a third network key based on the second network key, the third network key for a second network function of the mobile edge computing network, the second network function of the mobile edge computing network different from the first network function of the mobile edge computing network. The method includes sending a registration request message to the second network function of the mobile edge computing network, the registration request message integrity protected with the third network key. The method includes receiving a registration response message from the second network function of the mobile edge computing network. The method includes, in response to verifying the integrity of the registration response message using the third network key, establishing a secure communication with the second network function of the mobile edge computing network based on the third network key.

In certain embodiments, the method includes sending, to the network function of the wireless core network, an indication that the user equipment is capable of communicating with the mobile edge computing network. In one embodiment, the method includes sending, to the network function of the wireless core network, an identifier for the user equipment in a registration request message for the wireless core network. In some embodiments, the user equipment identifier comprises at least one of a 5G Globally Unique Temporary UE Identity, a Subscription Concealed Identifier, an EEC ID, and an external ID.

In various embodiments, the second network key for the first network function of the mobile edge computing network is derived using at least the first network key and a key distinguisher flag, the key distinguisher flag indicating which network key to derive for a network function of the mobile edge computing network.

In one embodiment, the key distinguisher flag specifies a network key for one of an edge configuration server ("ECS") function, an edge enabler server ("EES") server, and an edge application server ("EAS") function of the mobile edge computing network. In certain embodiments, the first network key comprises a network key associated with an Access and Mobility Management Function ("AMF") of the wireless core network.

Disclosed herein is a first apparatus for key-based authentication for a mobile edge computing network. The first apparatus may be implemented as a user equipment apparatus 600.

The first apparatus includes a processor that derives a first network key after authentication with a network function of a wireless core network and derives a second network key based on the first network key, the second network key for a first network function of a mobile edge computing network. The first apparatus includes a transmitter that sends a registration request message to the first network function of the mobile edge computing network, the registration request message integrity protected with the second network key. The first apparatus includes a receiver that receives a registration response message from the first network function of the mobile edge computing network. In response to verifying the integrity of the registration response message using the second network key, the processor establishes a secure communication with the first network function of the mobile edge computing network based on the second network key.

In one embodiment, the processor derives a third network key based on the second network key, the third network key for a second network function of the mobile edge computing network, the second network function of the mobile edge computing network different from the first network function of the mobile edge computing network. In certain embodiments, the transmitter sends a registration request message to the second network function of the mobile edge computing network, the registration request message integrity protected with the third network key.

In further embodiments, the receiver receives a registration response message from the second network function of the mobile edge computing network. In certain embodiments, in response to verifying the integrity of the registration response message using the third network key, the processor establishes a secure communication with the second network function of the mobile edge computing network based on the third network key.

In some embodiments, the transmitter sends, to the network function of the wireless core network, an indication that the apparatus is capable of communicating with the mobile edge computing network. In one embodiment, the transmitter sends, to the network function of the wireless core network, an identifier for the apparatus in a registration request message for the wireless core network.

In certain embodiments, the apparatus identifier comprises at least one of a 5G Globally Unique Temporary UE Identity, a Subscription Concealed Identifier, an EEC ID, and an external ID. In one embodiment, the second network key for the first network function of the mobile edge computing network is derived using at least the first network key and a key distinguisher flag, the key distinguisher flag indicating which network key to derive for a network function of the mobile edge computing network.

In some embodiments, the key distinguisher flag specifies a network key for one of an edge configuration server ("ECS") function, an edge enabler server ("EES") server, and an edge application server ("EAS") function of the mobile edge computing network. In further embodiments, the first network key comprises a network key associated with an Access and Mobility Management Function ("AMF") of the wireless core network.

Disclosed herein is a second method for key-based authentication for a mobile edge computing network. The method may be performed by a network equipment apparatus 700. The method includes receiving, at a network function of a wireless core network, a registration request message from a user equipment, the registration request message comprising at least one of an identifier for the user equipment and an indication that the user equipment is capable of communicating with a mobile edge computing network. The method includes deriving a second network key for a first network function of a mobile edge computing network based on a first network key associated with the network function of the wireless core network.

The method includes receiving an authentication request message for the user equipment from the first network function of the mobile edge computing network, the authentication request message integrity protected with the second network key. The method includes, in response to verifying the integrity of the received authentication request message using the second network key, sending an authentication response message to the first network function of the mobile edge computing network that indicates that the user equipment is authenticated for communicating with the mobile edge computing network.

In one embodiment, the authentication response message to the first network function of the mobile edge computing network further comprises the second network key. In some embodiments, the network function of the wireless core network comprises an Access and Mobility Management Function ("AMF"). In various embodiments, the second network key is derived using at least the first network key associated with network function of the wireless core network and a key distinguisher flag, the key distinguisher flag indicating which network key to derive for a network function of the mobile edge computing network.

Disclosed herein is a network equipment apparatus for key-based authentication for a mobile edge computing network. The network equipment apparatus includes a receiver that receives, at a network function of a wireless core network, a registration request message from a user equipment, the registration request message comprising at least one of an identifier for the user equipment and an indication that the user equipment is capable of communicating with a mobile edge computing network. The network equipment apparatus includes a processor that derives a second network key for a first network function of a mobile edge computing network based on a first network key associated with the network function of the wireless core network, wherein the receiver receives an authentication request message for the user equipment from the first network function of the mobile edge computing network, the authentication request message integrity protected with the second network key. The network equipment apparatus includes a transmitter that, in response to verifying the integrity of the received authentication request message using the second network key, sends an authentication response message to the first network function of the mobile edge computing network that indicates that the user equipment is authenticated for communicating with the mobile edge computing network.

In one embodiment, the authentication response message to the first network function of the mobile edge computing network further comprises the second network key. In some embodiments, the network function of the wireless core network comprises an Access and Mobility Management Function ("AMF"). In certain embodiments, the second network key is derived using at least the first network key associated with network function of the wireless core network and a key distinguisher flag, the key distinguisher flag indicating which network key to derive for a network function of the mobile edge computing network.

Disclosed herein is a third method for key-based authentication for a mobile edge computing network. The method may be performed by a network equipment apparatus 700. The method includes receiving, at a first network function of a mobile edge computing network, a network key request from a second network function of the mobile edge computing network, the network key request comprising a registration request message for a user equipment that is integrity protected with a first network key. The method includes deriving, at the first network function, the first network key based on a previously derived second network key associated with the first network function. The method includes verifying the integrity of the received registration request message using the first network key. The method includes sending a key response message to the second network function that comprises an indication of the integrity verification of the received registration request message and the derived first network key In one embodiment, the first network key is derived based on the previously derived second network key associated with the first network function and a key distinguisher flag, the key distinguisher flag indicating which network key to derive for a network function of the mobile edge computing network.

In certain embodiments, the method includes receiving the registration request message from the user equipment at the second network function, the registration request message comprising an identifier for the user equipment that is used to determine a network function for authenticating the user equipment and sending the network key request, including the registration request message, to the first network function.

In one embodiment, the user equipment identifier comprises at least one of a 5G Globally Unique Temporary UE Identity, a Subscription Concealed Identifier, an ECC ID, an EEC ID, an external ID, and an IP address. In some embodiments, the method includes sending the network key request to a network function within a wireless core network where the user equipment is authenticated and registered.

In one embodiment, the first network function comprises an edge configuration server ("ECS") and the second network function comprises an edge enabler server ("EES"), the first network key comprising a network key for the EES and the second network key comprising a network key for the ECS. In various embodiments, the first network function comprises an edge enabler server ("EES") and the second network function comprises an edge application server ("EAS"), the first network key comprising a network key for the EAS and the second network key comprising a network key for the EES.

In some embodiments, the method includes receiving the key response message from the first network function at the second network function, sending a registration response message to the user equipment from the second network function that includes the indication of the integrity verification of the received registration request message, the registration response message integrity protected with the derived first network key, and establishing a secure communication between the second network function and the user equipment using the derived first network key.

Disclosed herein is a network equipment apparatus of a mobile edge computing network for key-based authentication for a mobile edge computing network. The network equipment apparatus includes a receiver that receives, at a first network function of a mobile edge computing network, a network key request from a second network function of the mobile edge computing network, the network key request comprising a registration request message for a user equipment that is integrity protected with a first network key. The network equipment apparatus includes a processor that derives, at the first network function, the first network key based on a previously derived second network key associated with the first network function and verifies the integrity of the received registration request message using the first network key. The network equipment apparatus includes a transmitter that sends a key response message to the second network function that comprises an indication of the integrity verification of the received registration request message and the derived first network key.

In one embodiment, the first network key is derived based on the previously derived second network key associated with the first network function and a key distinguisher flag, the key distinguisher flag indicating which network key to derive for a network function of the mobile edge computing network.

In some embodiments, the receiver receives the registration request message from the user equipment at the second network function, the registration request message comprising an identifier for the user equipment that is used to determine a network function for authenticating the user equipment and the transmitter sends the network key request, including the registration request message, to the first network function.

In various embodiments, the user equipment identifier comprises at least one of a 5G Globally Unique Temporary UE Identity, a Subscription Concealed Identifier, an ECC ID, an EEC ID, an external ID, and an IP address. In some embodiments, the transmitter sends the network key request to a network function within a wireless core network where the user equipment is authenticated and registered.

In one embodiment, the first network function comprises an edge configuration server ("ECS") and the second network function comprises an edge enabler server ("EES"), the first network key comprising a network key for the EES and the second network key comprising a network key for the ECS.

In some embodiments, the first network function comprises an edge enabler server ("EES") and the second network function comprises an edge application server ("EAS"), the first network key comprising a network key for the EAS and the second network key comprising a network key for the EES.

In one embodiment, the receiver receives the key response message from the first network function at the second network function, the transmitter sends a registration response message to the user equipment from the second network function that includes the indication of the integrity verification of the received registration request message, the registration response message integrity protected with the derived first network key, and the processor establishes a secure communication between the second network function and the user equipment using the derived first network key.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
　derive a first network key after authentication with a network function of a wireless core network;
　derive a second network key based on the first network key, the second network key for a first network function of a mobile edge computing network;
　send a registration request message to the first network function of the mobile edge computing network, wherein the registration request message is integrity protected with the second network key;
　receive a registration response message from the first network function of the mobile edge computing network; and
　in response to verifying an integrity of the registration response message using the second network key, establish a secure communication with the first network function of the mobile edge computing network based on the second network key.

2. The UE of claim 1, wherein the at least one processor is configured to cause the UE to:
derive a third network key based on the second network key, the third network key for a second network function of the mobile edge computing network, the second network function of the mobile edge computing network different from the first network function of the mobile edge computing network;
　send a registration request message to the second network function of the mobile edge computing network, wherein the registration request message is integrity protected with the third network key;
　receive a registration response message from the second network function of the mobile edge computing network; and
　in response to verifying the integrity of the registration response message using the third network key, establish a secure communication with the second network function of the mobile edge computing network based on the third network key.

3. The UE of claim 1, wherein the at least one processor is configured to cause the UE to send, to the network function of the wireless core network, an indication that the UE is capable of communicating with the mobile edge computing network.

4. The apparatus UE of claim 1, wherein the at least one processor is configured to cause the UE to send, to the network function of the wireless core network, an identifier for the UE in a registration request message for the wireless core network.

5. The UE of claim 1, wherein the second network key for the first network function of the mobile edge computing network is derived using at least the first network key and a key distinguisher flag, the key distinguisher flag indicating which network key to derive for a network function of the mobile edge computing network.

6. The UE of claim 5, wherein the key distinguisher flag specifies a network key for one of an edge configuration server ("ECS") function, an edge enabler server ("EES") server, and an edge application server ("EAS") function of the mobile edge computing network.

7. The UE of claim 1, wherein the first network key comprises a network key associated with an Access and Mobility Management Function ("AMF") of the wireless core network.

8. A network equipment (NE), comprising:
at least one memory; and
at least one processor coupled with the at least one memory and configured to cause the NE to:
receive, at a first network function of a mobile edge computing network, a network key request from a second network function of the mobile edge computing network, the network key request comprising a registration request message for a user equipment (UE) that is integrity protected with a first network key;
derive, at the first network function, the first network key based on a previously derived second network key associated with the first network function;
verify an integrity of the registration request message using the first network key; and
send a key response message to the second network function that comprises an indication of verification of the integrity of the registration request message and the first network key.

9. The NE of claim 8, wherein the first network key is derived based on the previously derived second network key associated with the first network function and a key distinguisher flag, the key distinguisher flag indicating which network key to derive for a network function of the mobile edge computing network.

10. The NE of claim 8, wherein the at least one processor is configured to cause the NE to:
receive the registration request message from the UE at the second network function, the registration request message comprising an identifier for the UE that is used to determine a network function for authenticating the UE; and
send the network key request, including the registration request message, to the first network function.

11. The NE of claim 10, wherein the identifier for the UE comprises at least one of a fifth generation (5G) Globally Unique Temporary UE Identity, a Subscription Concealed Identifier, an error correction code (ECC) identifier (ID), an external ID, and an internet protocol (IP) address.

12. The NE of claim 8, wherein the first network function comprises an edge configuration server ("ECS") and the second network function comprises an edge enabler server ("EES"), the first network key comprising a network key for the EES and the second network key comprising a network key for the ECS.

13. The NE of claim 8, wherein the first network function comprises an edge enabler server ("EES") and the second network function comprises an edge application server ("EAS"), the first network key comprising a network key for the EAS and the second network key comprising a network key for the EES.

14. The NE of claim 8, wherein the at least one processor is configured to cause the NE to:
receive the key response message from the first network function at the second network function;
send a registration response message to the UE from the second network function that includes the indication of integrity verification of the registration request message, wherein the registration response message is integrity protected with the first network key; and
establish a secure communication between the second network function and the UE using the first network key.

15. A network equipment (NE), comprising:
at least one memory; and
at least one processor coupled with the at least one memory and configured to cause the NE to:
receive, at a network function of a wireless core network, a registration request message from a user equipment (UE), the registration request message comprising at least one of an identifier for the UE and an indication that the UE is capable of communicating with a mobile edge computing network;
derive a second network key for a first network function of a mobile edge computing network based on a first network key associated with the network function of the wireless core network;
receive an authentication request message for the UE from the first network function of the mobile edge computing network, the authentication request message integrity protected with the second network key; and
in response to verifying an integrity of the authentication request message using the second network key, send an authentication response message to the first network function of the mobile edge computing network that indicates that the UE is authenticated for communicating with the mobile edge computing network.

16. The NE of claim 15, wherein the authentication response message to the first network function of the mobile edge computing network further comprises the second network key.

17. The NE of claim 15, wherein the network function of the wireless core network comprises an Access and Mobility Management Function ("AMF").

18. The NE of claim 15, wherein the second network key is derived using at least the first network key associated with network function of the wireless core network and a key distinguisher flag, the key distinguisher flag indicating which network key to derive for a network function of the mobile edge computing network.

19. The NE of claim 15, wherein the identifier for the UE comprises at least one of a fifth generation (5G) Globally Unique Temporary UE Identity, a Subscription Concealed Identifier, an error correction code (ECC) identifier (ID), an external ID, and an internet protocol (IP) address.

20. The NE of claim 15, wherein the at least one processor is configured to cause the NE to send the network key request to a network function within a wireless core network where the UE is authenticated and registered.

* * * * *